Feb. 19, 1924.

F. L. SIMMONS

ROTARY MAGNETIC CHUCK

Filed April 11, 1918

Inventor
Frank L. Simmons
By Attorney
George Ramsey

Feb. 19, 1924.

F. L. SIMMONS

ROTARY MAGNETIC CHUCK

Filed April 11, 1918      8 Sheets-Sheet 7

1,484,090

Inventor
Frank L. Simmons
By Attorney
George Ramsey.

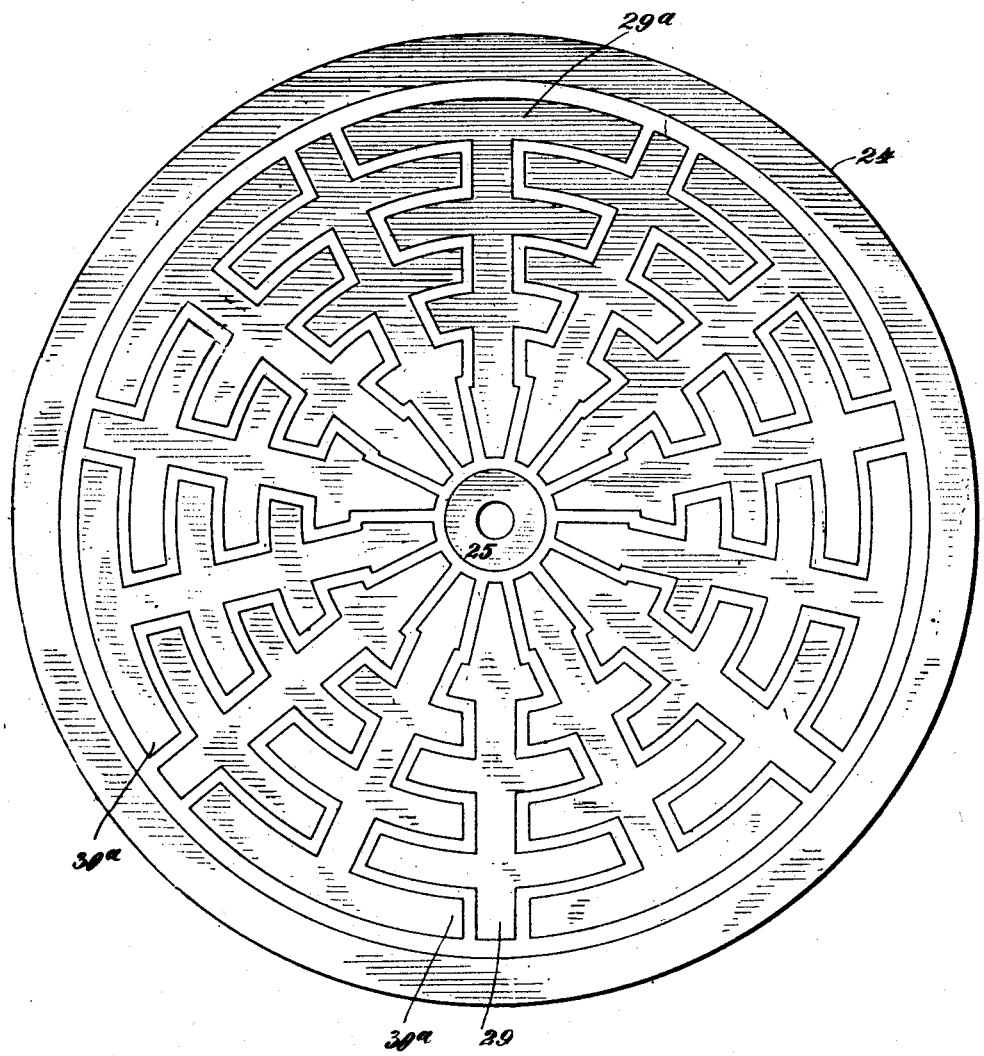

Patented Feb. 19, 1924.

1,484,090

UNITED STATES PATENT OFFICE.

FRANK L. SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

ROTARY MAGNETIC CHUCK.

Application filed April 11, 1918. Serial No. 227,893.

*To all whom it may concern:*

Be it known that I, FRANK L. SIMMONS, a citizen of the United States, residing at Woonsocket, in the county of Providence, State of Rhode Island, have invented certain new and useful Improvements in Rotary Magnetic Chucks, of which the following is a specification.

This invention relates broadly to chucks and more particularly to a rotary magnetic chuck.

The principal object of the present invention is to provide a rotary magnetic chuck with energizing units mounted to produce a magnetic field of substantially uniform radial and concentric strength over the face plate.

A further object of the present invention is a magnetic chuck as specified, wherein the energizing units are mounted within a housing in such manner that the energizing units and the face plate pole pieces comprise the magnetic circuits, to the exclusion of the housing and the chuck holder.

A still further object is a magnetic chuck as specified, wherein the magnet pole pieces with the magnets thereon are mounted within the housing and separated therefrom by non-magnetic supports in such manner that the metal mass of the energizing unit is uniformly distributed around the axis of rotation of the chuck.

A still further and important object of the present invention is a magnetic chuck of the character specified wherein the chuck is made of interchangeable units comprising a housing, a magnet core piece, interchangeable magnets adapted to be mounted on said core piece, interchangeable face plates for cooperation with said housing and the poles of said core piece, and an interchangeable unit comprising the collector rings, whereby any element of one chuck will exactly fit to replace a corresponding element in a chuck of the same type and size.

A still further and primary object of the present invention is a collector ring mount for rotary magnetic chucks comprising a unit formed of a pair of collector rings provided with flanges and set into a support of plastic or moldable insulating material as bakelite or the like.

A still further and equally primary object of the present invention is a rotary magnetic chuck provided with a plurality of energizing coils and having certain connections for said coils terminating in a connector block in the base of the chuck, whereby the chuck may be adapted for currents of various voltages by suitable adjustment of the terminal members on said connector block and without dis-assembling the chuck.

Another and very important phase or object of the present invention is a face plate for a rotary chuck composed of pole pieces having body portions extending substantially radially of the face plate and having meander lines of non-magnetic material between the edges of the body portions to provide a substantially uniform field over the face plate when the chuck is energized.

A still further object of the present invention is a face plate as specified, wherein the face plate pole pieces are arranged radially and are all substantially of the same length with non-magnetic spaces between the edges of each pole piece, said non-magnetic spaces comprising angular lines substantially symmetric relative to radii of the face plate and extending midway between the center lines of the bodies of the face plate pole pieces.

A further object of the present invention is a magnetic chuck as specified, wherein the chuck is constructed with the energizing units and the face plate pole pieces symmetrically arranged around an axis of rotation as the primary feature of the chuck, with a non-magnetized supporting housing as the secondary or subsidiary feature of the chuck, whereby the magnetic portion of the chuck is the work-holding portion, and the housing is merely the support for the working or operative part of the chuck.

Another object of the present invention is a face plate for a rotary chuck comprising a non-magnetized outside frame, a non-magnetized hub with magnetizable pole pieces mounted between said frame and said hub and separated therefrom respectively by non-magnetic material adapted to act as an interlock or binder to retain the pole pieces in position.

The present invention possesses many other advantageous features, some of which, with the foregoing, will be set forth at length in the following description, wherein will be outlined in full that form of the invention which I have selected for illustration in the drawings accompanying and forming a part of the present specification.

In the drawings I have shown only one specific form of my generic invention, but it is to be understood that I do not limit myself to such form, because my invention may be embodied in a multiplicity of forms, each being a species of my said invention. It is also to be understood that by the claims succeeding the description of my invention I desire to cover the invention in whatsoever form it may be embodied.

Reference will now be made to the drawings, wherein like characters are used to represent like parts throughout the several figures thereof.

Figure 13 is a view showing a face plate comprising a slightly modified form of face plate pole pieces.

Figure 1:
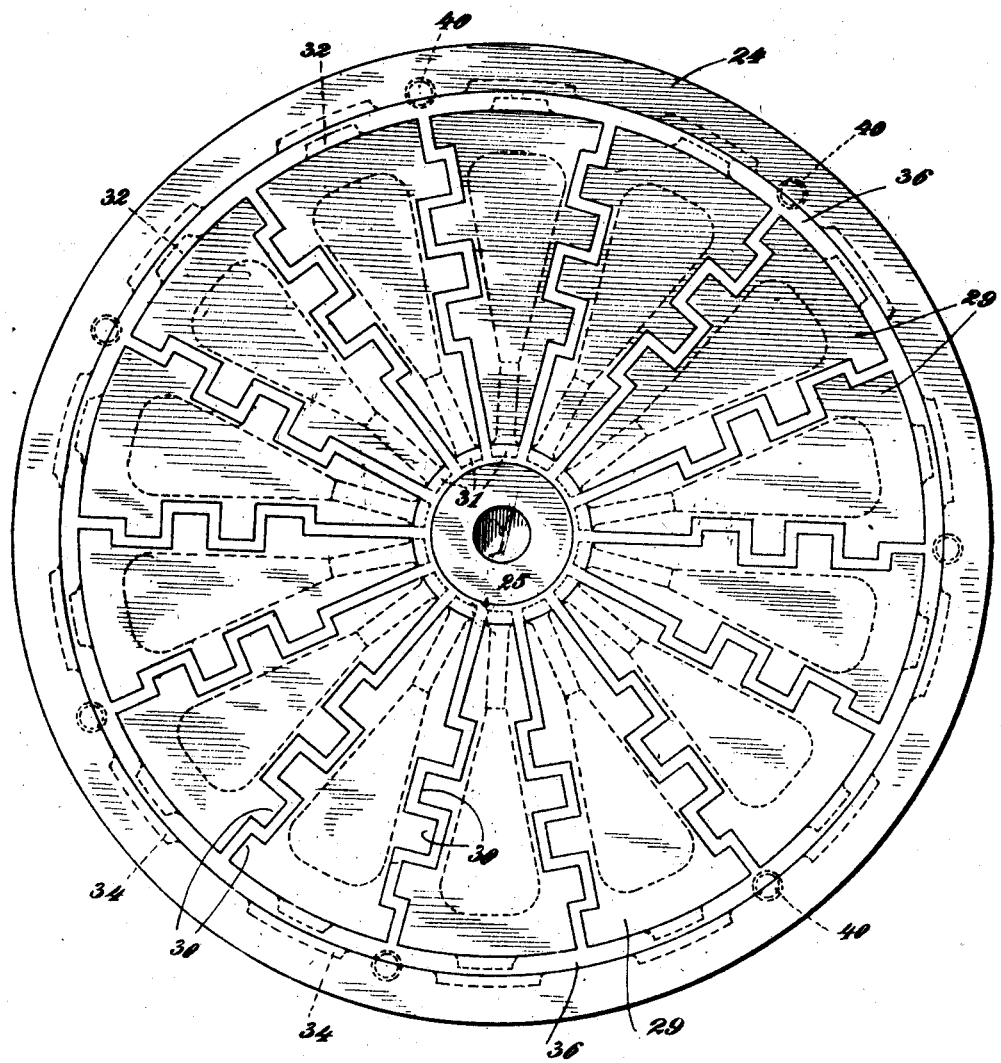
Figure 1 is a plan view of the front of the face plate in position on the chuck.
Figure 2:
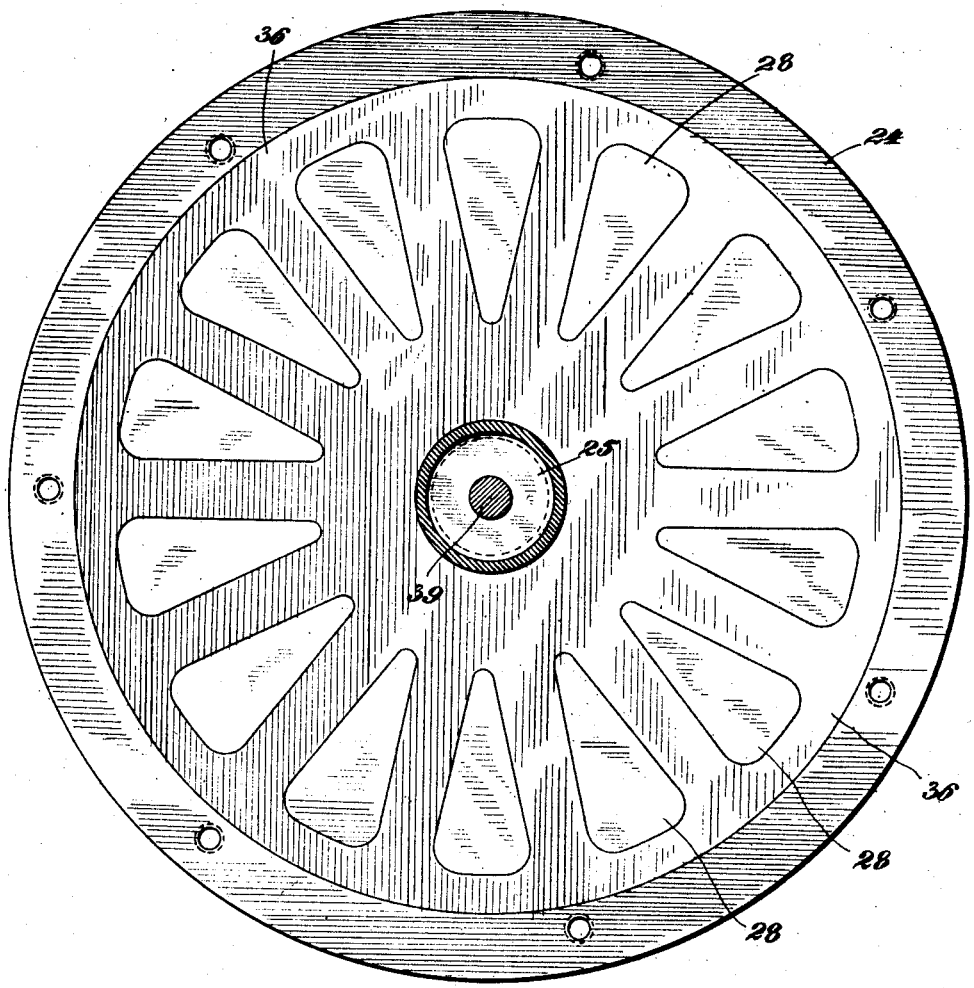
Figure 2 is a plan view of the back of the face plate removed from the housing.

Heretofore in the art of magnetic chucks it has been the practice to so construct the chuck that the housing formed one portion of the magnetic circuit, whereby the machine carrying the chuck comprised a shunt magnetic circuit. By such construction a considerable amount of the holding force of the chuck is lost. There is still a further disadvantage in this construction in that the tools become magnetized and metal chips are carried with the tools, whereby the work is scarred and the tools injured. It has also been common practice in the magnetic chuck art to provide pole pieces the axes of which are parallel and extend across the chuck. In such constructions the metal mass is not symmetric around the axis of the chuck and the holding or magnetic field is not uniform concentric with the axis of the chuck, as is extremely desirable in rotary chucks. Rotary chucks have also been constructed with a series of concentric face plate pole pieces wherein the pole pieces comprise a series of concentric broken rings. In this type of chucks, pieces of work lapping a plurality of these thin rings short-circuits the magnetism of these rings in such manner that a piece of work on the opposite side is not held with the same strength that would occur where work on each side is held by entirely independent pole pieces. Furthermore, in rotary magnetic chucks the forces set up by the tool tend to move or slide the work on the chuck face in a direction substantially concentric with the axis around which the chuck rotates. It is easier to move a piece of material along a magnetic field than it is to move it across the magnetic field; therefore there is less holding power, and consequently resistance to the specified forces, in a concentric ring pole chuck than in a rotary chuck where the poles are arranged radially. Rotary magnetic chucks have also been built with face plate pole pieces bounded by straight radial lines. Because of the foregoing specified fact that work may be moved more easily along the lines between poles than across poles, in magnetic chucks having straight radial-sided pole pieces, there is a tendency for the work to creep outward because of centrifugal force when the chuck is in operation. Furthermore, heretofore in the art, it has been the practice, where radially arranged pole pieces are provided in the face plate, to form one half of the pole pieces integral with a pole piece carrying ring and hub, and to form the other half of the pole pieces from a plate adapted to set over the first-mentioned ring. The face plate is then made up by filling the spaces between the plate poles and the ring poles with babbitt or other non-magnetic material. In constructions of this character, where one set of poles laps a portion of another set of poles, there is a very undesirable magnetic leakage at the lapped parts, so that the effective force is very greatly reduced. Also, in the prior art, considerable difficulty has been encountered in mounting the large collector rings for the electric current so that the rings may be securely mounted upon and insulated from the housing or chuck body, and also in such manner that the rings can be easily removed for repairs or truing. A common practice in the prior art has been to provide recesses in the chuck body and setting the rings in molten sulphur. When metal dust settles over the sulphur sufficiently to start a short circuit whereby the sulphur is heated, the sulphur becomes a conductor and a serious short circuit results. Wood and various kinds of vulcanite have been tried as a ring mount but difficulty in shrinkage and warping is encountered. These are but a few of the difficulties of the prior art; there are many others which could be specified.

The present invention solves the difficulties of the prior art by providing a rotary chuck wherein the holding or magnetic features are, in a certain sense, a segmental ring saturated with magnetism and being uniformly arranged around an axis of rotation with a sufficiently powerful supporting body, not magnetized, to attach this holding member to the spindle of a machine tool. This obviates magnetic shunts through the machine tool and provides a maximum magentic field over the work face plate. While the poles are arranged radially, the lines between the poles are meander lines, so that work is held from movement in both rotative and radial directions. Each pole piece in the work face is energized by a separate coil and is magnetically independent of the remaining pole pieces other than those immediately adjacent. This provides a construction wherein placing of work on one portion of the face plate does not diminish the holding power of another independent portion. The pole pieces in the face plate are so constructed that in the preferred form there is substantially no overlapping of metal, so that the tendency of leakage is very greatly minimized.

The collector rings are molded into a base of insulating material so that the entire insulating base and the collector rings are substantially an integral unit which may be removed whenever desired for any suitable purpose such as cleaning, truing, or repairing.

In a more particular sense the preferred embodiment of the present invention comprises a housing of suitable material, preferably metal, which, in effect, is a hollow round box and carries a chuck-head or holder adapted to be secured to the spindle of a suitable machine tool, and which housing carries the electrical and magnetic elements. A portion of the electrical unit comprises a suitable number of collector rings, preferably of copper, having flanged bases which are notched at suitable intervals, and which bases are set in bakelite that is molded around the rings to comprise a flat insulating ring of bakelite adapted to be seated on the base of the housing.

The electro-magnetic element comprises more particularly a ring, preferably in the form of a plate, from one side of which extend a plurality of core pole pieces of substantially sectorial cross-section, with the sides of adjacent pole pieces parallel so that when the ring is cast of mild-magnetic steel, or other suitable material, the sides of the pole pieces may be smoothed by running an emery wheel or other tool in the spaces between the pole pieces. Each pole piece is adapted to carry a suitably sectorial-shaped energizing coil which tightly fits over the pole piece and is substantially insulated therefrom. These coils are constructed to be connected together at their outer ends to form pairs, and the adjacent coils of the pairs are connected together at their inner ends with the coils arranged in groups and the terminal wires from each group connected as a pair to certain members of a terminal block, whereby, when the parts are connected and energized, the core pieces will be oppositely polarized. The other terminal members of the groups are operatively connected with the collector rings by means of which the current is led from circuit wires to the coils. The connections to the connector block are so arranged that the groups of coils may be connected either in series or in multiple without affecting the magnetic polarity of the poles, whereby the chuck is adaptable for current of different voltages. The front of the housing is closed by a suitable face plate which is made up of a ring and a hub, with independent pole pieces extending substantially from the hub to the ring and separated therefrom and from each other by suitable non-magnetic material. The pole pieces in the face plate correspond in number to the core pole pieces. The ends of the core pole pieces may be coplanar with the edges of the housing. The back of the face plate is preferably substantially a plane wherein the exposed parts of the face plate pole pieces appear as islands in the non-magnetic metal. These exposed parts, or islands, of the face plate pole pieces engage with and are seated directly on the ends of the core piece pole pieces when the face plate is secured in position on the housing by suitable through bolts or screws. The work face of the face plate in the preferred form comprises a plane surface made up of the independent pole pieces separated preferably by strips of non-magnetic metal comprising meander lines forming right angles, so that the conformation of each pole is a tree-like member with a body portion and limbs extending on each side of the body portion and whereby the limbs of one pole piece interlock with those of the adjacent pole pieces. The base of the chuck preferably is hollowed out to comprise a recess beneath the chuck holder or head, in which recess may be set the terminal block, by means of which the resistance of the chuck may be controlled as specified by connecting the coils either in series or in multiple, to adopt the chuck for use to different voltages.

Referring now to the drawings that illustrate one embodiment of the invention, the chuck body or housing comprises a shell having a cylindrical side wall 1 and a center post 2. These are connected by the back plate 4 which may be integral therewith, and which is recessed to carry the head or holder 5 that is threaded or constructed to fit the spindle of a suitable machine tool (not shown).

The interior of the housing is hollow, and the base or back plate is provided with lugs or seats 6 that are machined to a common surface and provide supports for non-magnetic washers 7, on which the core pole piece ring 8 is seated. This core piece ring carries wedge- or sectorial-shaped poles 9 and is secured to the housing by machine screws 10 that pass through the washers 7 and are screw-threaded into the back plate 4 through the lugs 6. Energizing coils 11 are mounted one on each of the pole pieces 9, and, in the preferred form, comprise groups wherein the coils are so mounted and connected that the current is reversed in each alternate coil, whereby the magnetism of adjacent poles is opposite. The polarity of the core ring poles is so arranged that each pole is a part of two adjacent magnetic circuits whereby the whole magnetic system might be likened to a ring of interlocked circuits to form a circular endless chain of forces with a part of the forces of each link in the chain passing through the air (or a work piece) over the work face of the chuck.

Figure 12:
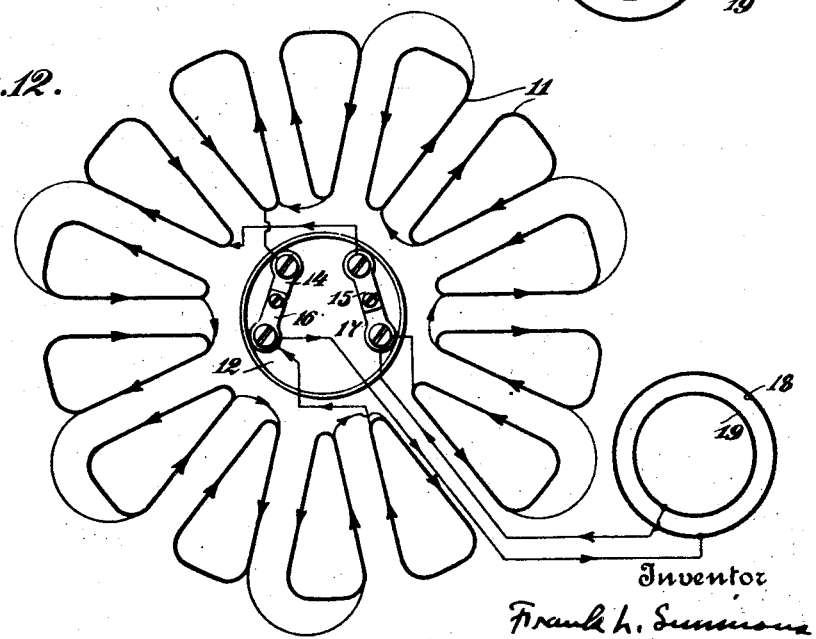
Figure 12 is a view showing the terminals of the connector plate connected for a 110-volt circuit and also showing a diagrammatic representation of the coils around the connector plate.

Preferably the base or back plate 4 is recessed beneath the seat for the head or holder 5, and a connector plate 12 of suitable insulating material may be set in this recess. Preferably, the coils 11 are wired in groups, and the terminal of one group may be connected with the swinging arm 14 on the connector plate and the terminal of the other group of coils is connected with the swinging arm 15. The swinging arms 16 and 17, as well as the other terminal members of the coils, (see diagrammatic Figures 12 and 13) are connected with the collector rings through insulating bushing in the back plate 4. The swinging arms 14, 15, 16, and 17 are so positioned relatively to each other that the arms 16 and 17 cannot be connected together, whereas the arm 14 may connect either with the arm 15 or the arm 16; and, likewise, the arm 15 may connect either with the arm 14 or the arm 17. This construction prevents short-circuiting by contact of arms 16 and 17 and permits the arms 14 and 15 to be connected, thus throwing the coils in series for 220-volt circuits; and enables the arms 14 and 16, and 15 and 17, to be connected, respectively, to arrange the circuits in multiple and adaptable for 110 volts.

Figure 3:
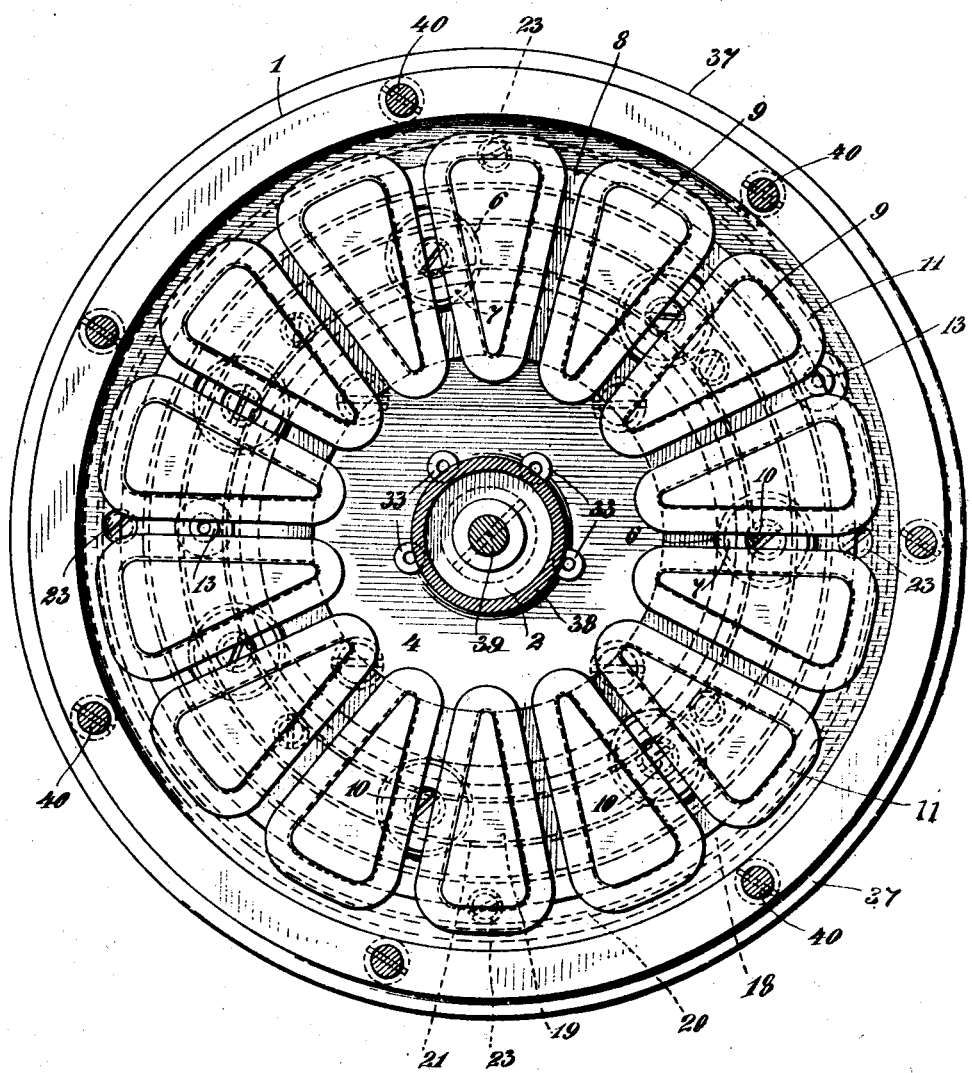
Figure 3 is a plan view of the housing with the face plate removed.
Figure 4:
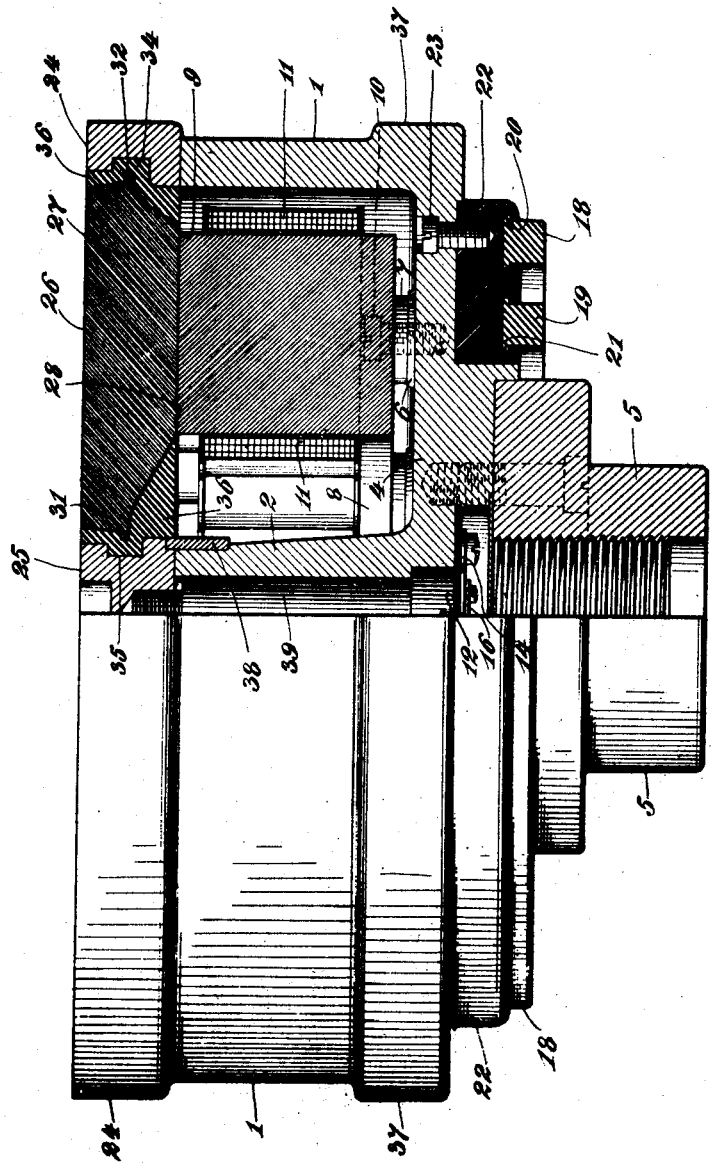
Figure 4 is an elevational view showing one-half of the chuck in section.
Figure 5:
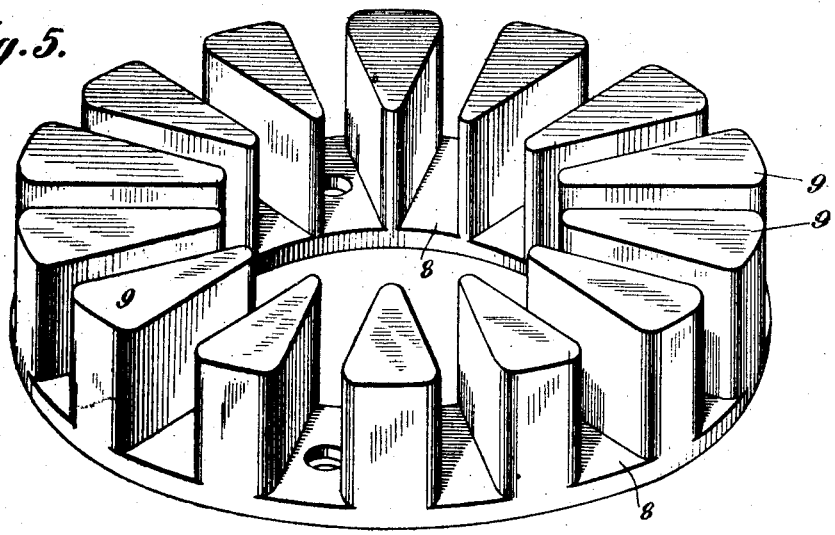
Figure 5 is a perspective view of the core pole piece ring with the energizing coils removed.
Figure 6:
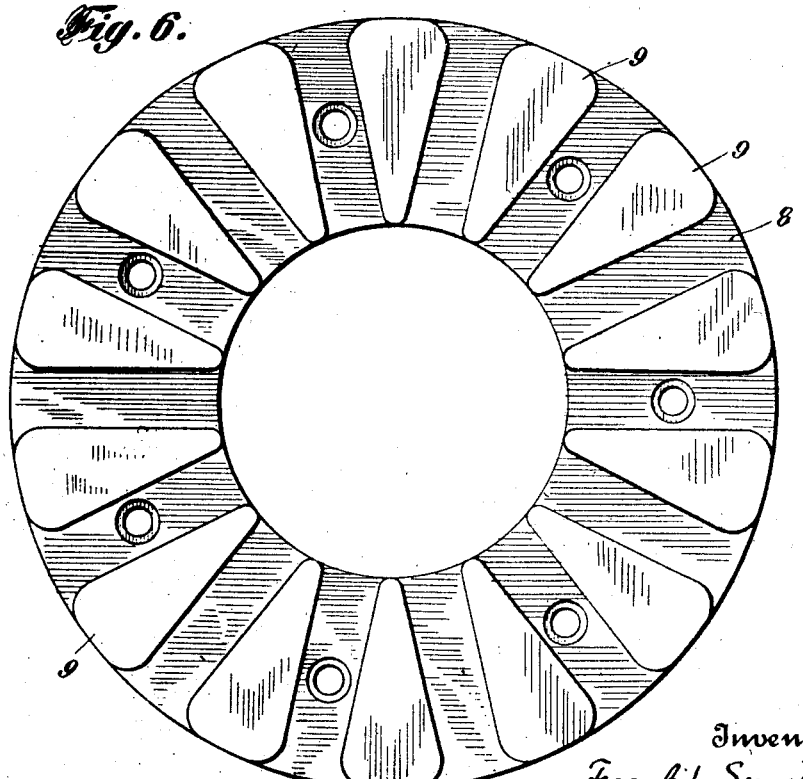
Figure 6 is a plan view of the core pole piece ring with the coils removed.
Figure 7:
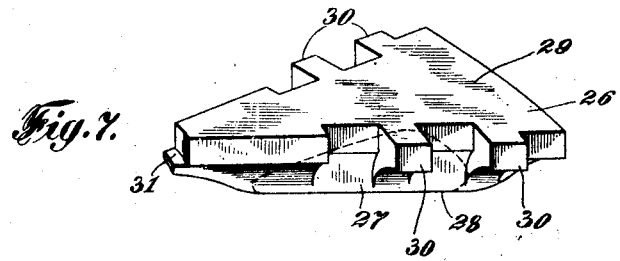
Figure 7 is a perspective view showing a face plate pole piece before it is set in the face plate.
Figure 8:
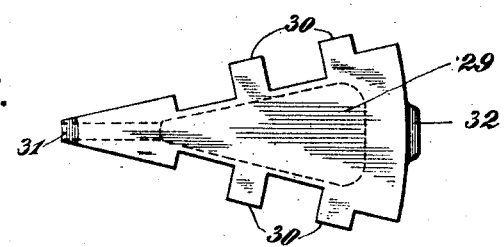
Figure 8 is a front plan view of the said face plate pole piece.
Figure 9:
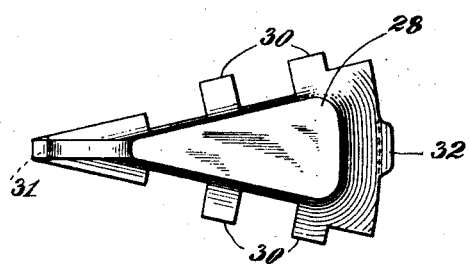
Figure 9 is a back plan view of the said face plate pole piece.
Figure 10:
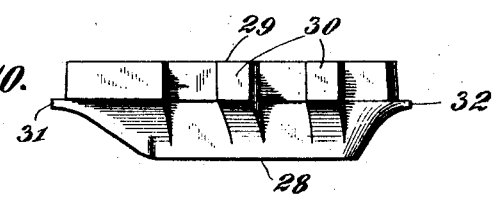
Figure 10 is a side view of the same pole piece.
Figure 11:
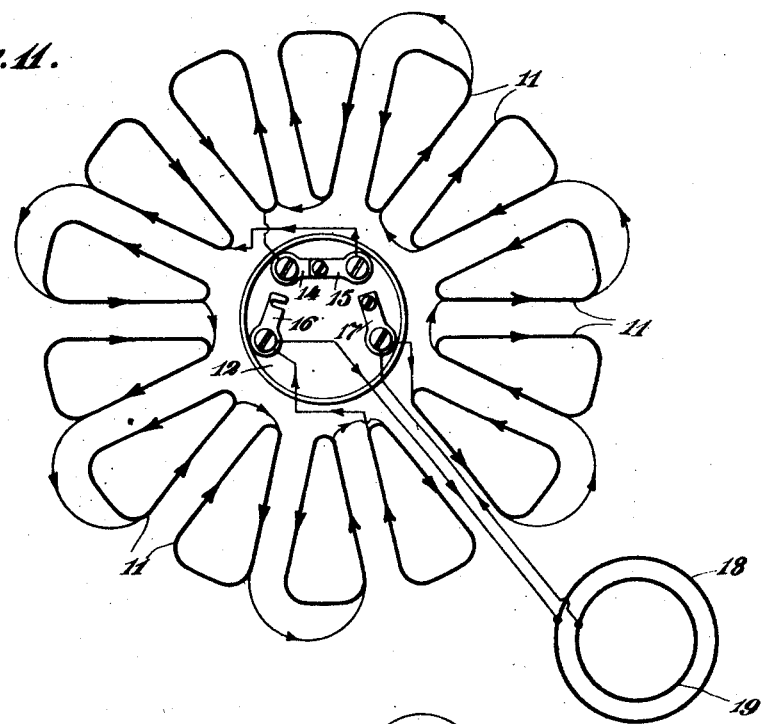
Figure 11 illustrates the connector plate with the system of connection for the coils shown diagrammatically around the connector plate and with the terminals of the connector plate arranged for the chuck to be suited to a 220-volt circuit.

The collector rings system comprises a pair of copper rings 18 and 19 adapted to be served by brush holders (not shown) and are flanged as at 20 and 21 with the flanges notched and embedded in an insulating ring 22 of bakelite or other suitable heat-hardened plastic insulating material, whereby the rings in the insulating base are a unit adapted to be attached to or removed from the back plate 4 as an integral member. The attaching means may comprise suitable machine screws 23. The rings 18 and 19 are connected with the coils through suitable insulating bushings 13 (see Figure 3) and the connector plate may also be connected to the coils through similar insulating bushings 33 that lead through the base of the back plate 4 to the connections on the connector plate.

The face plate (Figure 1), which is an important element of the present invention, is composed of a supporting or framing ring 24 and a hub 25, with face plate pole pieces 26 secured between the hub and the ring. The face plate pole pieces comprise a body portion 27 which terminates on the back in a sector-shaped section 28 and in a tree-like conformation on the front. This tree-like conformation comprises a main or trunk portion 29 from which extend side members 30 that may be likened to the branches of the tree. The inner ends of the pole pieces are provided with lugs 31, and the outer ends are provided with other lugs 32. The supporting or framing ring 24 is recessed as at 34 around each of the lugs 32; and the hub 25 is provided with an annular recess 35, toward which lugs 31 are adapted to extend. Each pole piece 26 is entirely surrounded by non-magnetic metal 36, and the conformation of the pole pieces is such that the non-magnetic metal is thinnest adjacent the surface of the work face portion of the face plate, whereby the edges of adjacent poles are nearer together than any other part of the poles. In Figure 13 the trunk portions 29ª of the face of the pole pieces is somewhat more narrow than the trunk portions 29 shown in Figure 1, and the side members or branches 30ª are progressively longer from center to periphery than are the branches 30 in Figure 1; and also the edges of the branches 30ª are preferably curved, whereas the edges of the branches 30 are preferably straight.

The face plate extends slightly beyond the side walls 1 of the housing to form a rib, and the rear edge of the housing is provided with a similar flat rib 37 that corresponds to that of the face plate, so that where the chuck is rested edgewise on a plane surface the axis of the chuck is substantially horizontal and there is no tendency of the chuck to fall over. The center post 2 of the housing is shouldered to carry a centering band 38 of non-magnetic material which seats into a groove in the hub 25, whereby the positioning of the face plate over the housing properly centers the face plate in position; this is of value and importance in assembling the parts. The center post 2 preferably is hollow, and a screw-bolt 39 extends through the center post and is screw-threaded into the hub 25; while a plurality of screw-bolts 40 extend through the cylindrical side wall 1 and are threaded into the supporting rim or frame 24, thus securing the face plate on the housing to comprise a water-tight joint between the face plate and housing and also to firmly tie the chuck together.

From the foregoing it is evident that one essential feature of the present chuck is the emphasizing of the magnetic holding elements comprising the core ring and the face plate pole pieces, which are so constructed as to be very compact and substantially magnetically isolated from the supporting ring, the head, and the housing, which parts, though necessary to support and protect magnetic parts, are subordinated entirely to protecting and supporting functions.

Having thus described my invention what I claim is:

1. In a rotary magnetic chuck the combination of a hollow housing having a cylindrical side wall and a back portion integral with the side wall, a core piece member provided with a plurality of pole pieces thereon, said member being mounted within and spaced apart from the walls of said housing, a face plate comprising face plate pole pieces separated one from another by non-magnetic material, said face plate being provided with parallel surfaces and with its pole pieces having sides exposed on each surface, the back surface of the face plate being constructed to be seated upon and to hermetically seal the said housing with the face plate pole pieces contacting with the ends of the core piece pole pieces, and means for energizing all of said pole pieces.

2. In a rotary magnetic chuck the combination of a housing comprising an integral open cup, core pole pieces carried by a common base and mounted within said housing with the common base supported upon non-magnetizable supports and separated from the walls of the said housing, a face plate provided with a plurality of face plate pole pieces and adapted to hermetically seal the said housing, said face plate pole pieces being symmetrically arranged around the center of said face plate, a hub member adjacent the inner end of said pole pieces, a ring around the outer ends of the pole pieces, means for energizing said pole pieces, and means for securing the face plate in position on the housing.

3. In a rotary magnetic chuck the combination of an integral hollow housing, a removable head carried by said housing adapted to be fitted to a machine tool for supporting the said chuck, core pole pieces within said housing, all of said core pole pieces being carried on a common base, non-magnetic supports upon which said base is mounted whereby said core pole pieces are supported within and spaced apart from the walls of the said housing, the ends of the core pole pieces being coplanar with the edge of the side wall of the housing, a detachable flat face plate being adapted to be seated on the edge of the side wall of the housing to hermetically seal said housing, pole pieces in said face plate being constructed to engage the core pole pieces when said face plate is in position on the housing, means for energizing the said pole pieces whereby adjacent poles are of different polarity, and means for securing said face plate in position on said housing.

4. In a rotary chuck in combination an integral hollow housing, raised portions on the interior back wall of said housing the surfaces of said raised portions all being in a common plane, a core pole piece mounted within said housing and comprising a base member with a plurality of pole pieces carried by said base member and symmetrically arranged around the axis of rotation of the chuck, non-magnetic supports between said raised portions and said base member, the ends of the pole pieces being substantially coplanar with the edges of the wall of the housing, a face plate having flat parallel sides and comprising a plurality of pole pieces adapted to engage the pole pieces of the core piece, a hub supporting the inner ends of said face plate pole pieces, a frame for supporting the outer ends of said face plate pole pieces, means to secure said face plate upon said housing, and means for energizing all of said pole pieces.

5. In a rotary magnetic chuck the combination of a hollow cylindrical housing, a hollow center post extending from the back of said housing and terminating substantially coplanar with the side wall of said housing, a core piece ring within said housing and being provided with a plurality of core pole pieces symmetrically arranged around said center post, a face plate having pole pieces corresponding in number to the pole pieces on said core piece, means to energize all of said pole pieces, and means to secure said face plate in position to hermetically seal said housing.

6. In a magnetic chuck the combination of a hollow housing, a removable head carried by the back of said housing adapted to be fitted to a machine tool for carrying the chuck, an electrical connector block mounted in a recess between said head and said housing, whereby said head protects and partially covers said connector block, terminal members carried by said connector block, a face plate being provided with a plurality of face plate pole pieces, electromagnetic means being electrically connected with the terminals of said connector block, means whereby said terminals may be adjustably connected to vary the resistance of said chuck, and means for leading a suitable electrical current to said electro-magnetic means.

7. In a rotary magnetic chuck a hollow shell, a plurality of core pole pieces mounted within said housing and spaced apart therefrom, said core pole pieces being carried by a common base ring and the axis of said core pole pieces extending substantially parallel to the axis of rotation of the chuck, said core pole pieces being substantially sectorial in cross-section and being arranged symmetrically around the axis of rotation of the chuck, individual energizing coils for each core pole piece, said coils being so connected that the polarity of each pole piece is opposite to that of adjacent pole pieces, a face plate hermetically sealing said housing and being provided with face plate pole pieces adapted to cooperate with the core pole pieces, and means for leading a suitable electric current to said coils.

8. In a rotary magnetic chuck the combination of a continuous hollow housing, a plurality of core pole pieces within said housing, the cross-section of said core pole pieces being substantially sectorial and the sides of said core pole pieces being substantially parallel to radial planes of the chuck, a common base ring upon which all of said core pole pieces are mounted, said base ring being of a width substantially commensurate with the radial length of the core pole pieces, an individual energizing coil carried by each core pole piece, said coils being connected in such manner that the polarity of adjacent core pole pieces is of opposite sign, a face plate carrying pole pieces adapted to cooperate with the core pole pieces, and means for leading a suitable electric current to said coils.

9. In a magnetic chuck the combination of a continuous hollow housing, a core piece ring, a plurality of pole pieces integral with said ring and radially arranged thereon, individual energizing coils for each pole piece, a face plate being provided with a number of poles corresponding numerically to the pole pieces in said core piece ring, and means for leading a suitable electric current to said coils to energize said pole pieces.

10. A rotary magnetic chuck having a non-magnetized body portion a face plate comprising a holding portion formed entirely of a plurality of radially arranged separate sectorial pole pieces, non-magnetic material surrounding said pole pieces and isolating one pole piece from another, core members for the pole pieces, coils on the core members, each pole piece having a body portion contacting with a core member and lateral projections extending from said body portion, the projections from one pole piece extending between the projections from an adjacent pole piece.

11. A rotary magnetic chuck having a circular face plate with the poles thereof comprising a plurality of radially arranged separate sectorial pole pieces, non-magnetic material isolating one pole piece from another, each pole piece having a body portion and lateral projections extending from said body portion, the projections from one pole piece extending between the projections from an adjacent pole piece.

12. A rotary magnetic chuck having a face plate comprising a plurality of radially arranged separate individual pole pieces, non-magnetic material isolating said pole pieces one from another, means to support the inner ends of the pole pieces, and means to support the outer ends of said pole pieces.

13. A magnetic chuck having a face plate comprising a plurality of separate radially arranged adjacent pole pieces, extensions on one pole piece being interspaced between extensions on an adjacent pole piece on the work face of the chuck, non-magnetic material isolating the pole pieces one from another, hub means to support the inner ends of the pole pieces, and a supporting frame member to support the outer ends of said pole pieces.

14. In a rotary magnetic chuck a supporting member, electro-magnetic energizing devices, in combination with a face plate provided with pole pieces adapted to be magnetized by said electro-magnetic devices, said pole pieces comprising body portions, extensions from each side of said body portions whereby the work face of said pole piece is substantially tree-like in form, a hub member securing one end of said pole pieces, and a ring member securing the other end of said pole pieces.

15. In a rotary magnetic chuck a supporting housing, electro-magnetic means carried by said supporting housing, means for leading a suitable electric current to said electro-magnetic means, in combination with a detachable face plate comprising a plate composed of magnetic and non-magnetic material, with the magnetic material comprising pole pieces and having the edges thereof entirely surrounded and supported by the non-magnetic material, with the said materials distributed over the work face of the face plate in one geometric outline and distributed over the back of the plate in a different geometric outline and with the outlines on both the front and the back symmetric to radii of the face plate.

16. In a rotary magnetic chuck a supporting housing, electro-magnetic means carried by and supported within said housing, means for conducting a suitable electric current to said electro-magnetic means, in combination with a face plate comprising a non-magnetized ring, magnetizable face plate pole pieces within said ring, non-magnetizable material extending between and entirely enclosing the edges of said pole pieces, the work face of said pole pieces being bounded by meander lines extending radially of the face plate with a portion of said lines substantially parallel to radii of the face plate.

17. In a rotary magnetic chuck a supporting housing, electro-magnetic means within said supporting housing, means for leading a suitable electric current to said electro-magnetic means to energize said electromagnetic means, in combination with a face plate, said face plate comprising a plurality of drop-forged pole pieces having work faces in the conformation of trees arranged around the center of the face plate with the bodies of the trees being radially disposed and the limbs of the trees extending at substantially right angles to the radii of the face plate, and with the tops of the trees toward the center of the face plate.

18. In a rotary magnetic chuck a supporting shell, electro-magnetic means supported by said shell, in combination with a face plate comprising a frame ring, a hub, and individual pole pieces between said ring and said hub, non-magnetic material separating the ring the hub and the said pole pieces one from another, said magnetic means being operatively connected to said pole pieces to alternately polarize said pole pieces when said electromagnetic means is energized, and means for leading a suitable electric current to said electro-magnetic means.

19. In a rotary magnetic chuck a supporting housing, electro-magnetic means magnetically insulated from and mounted within and enclosed by said supporting housing, in combination with a face plate, said face plate comprising a frame ring and a hub, pole pieces between said frame ring and said hub, a post for supporting the hub, and non-magnetic material interlocking said pole pieces with said ring and said hub and magnetically isolating each pole piece, the parts being constructed and arranged in such manner that the said supporting housing, the said ring, and the said hub remain non-magnetized when said electro-magnetic means is energized to magnetize the pole pieces.

20. In a rotary magnetic chuck a supporting housing, electro-magnetic means carried by and supported within said supporting housing, in combination with a face plate, said face plate comprising a frame ring, a hub, and pole pieces radially arranged between said frame ring and said hub, said frame ring and said hub being provided with retaining recesses, projections on said pole pieces and adapted to extend opposite the said recesses, non-magnetic material completely surrounding the edges of said pole pieces and filling said recesses, whereby the said pole pieces are interlocked between the hub and the frame ring.

21. In a rotary magnetic chuck a housing, electro-magnetic energizing means within said housing, in combination with a face plate, said face plate comprising a plurality of adjacent pole pieces, said electro-magnetic energizing means having a common path for part of each magnetic circuit whereby a uniform magnetic field may be obtained over the said pole pieces, the work face edges of said pole pieces comprising meander lines the lines of direction of which are substantially parallel to radii of the face plate whereby work pieces may be held against both rotative and centrifugal forces, and means for leading a suitable electric current to said electromagnetic energizing means.

22. In a rotary magnetic chuck a supporting shell, electro-magnetic means mounted within said supporting shell, in combination with a face plate, said face plate comprising a plurality of pole pieces, non-magnetic material completely surrounding the edges of said pole pieces, the work-face area of each pole piece being of a tree conformation, and the back area of each pole piece being substantially sectorial, and connections for said electro-magnetic means whereby when said electromagnetic means is energized said pole pieces are alternately polarized, and means for leading a suitable electric current to said electromagnetic means.

23. As an article of manufacture a face plate for rotary magnetic chucks and the like comprising a hub, a ring forming the outer edge of said face plate, and a plurality of pole pieces radially arranged around said hub and extending between said hub and said ring, and non-magnetic material isolating one pole piece from another.

24. As an article of manufacture a face plate comprising in combination a supporting hub forming the center of the face plate, a retaining ring forming the outer edge of the face plate, and a plurality of tree-like pole pieces extending between said hub and said retaining ring with the branches of adjacent pole pieces interlocked, and non-magnetic material separating the pole pieces from said retaining ring and said hub and from one another.

25. As an article of manufacture a pole piece for the work face of a rotary magnetic chuck, said pole piece comprising magnetizable material arranged to form a body portion having a sectorial flat base and a tree-like flat work face, and retaining means whereby said pole piece may be interlocked in a suitable frame to comprise a portion of a rotary chuck face plate.

26. As an article of manufacture a pole piece for a rotary magnetic chuck face plate, said pole piece comprising a drop-forging of Swedish iron and having a body portion provided with a sectorial area on the back of the pole piece and with a tapering tree-like conformation on the front of the pole piece.

27. As an article of manufacture a work face pole piece for rotary chucks and the like comprising magnetizable material arranged with a work face comprising a tapering tree-like conformation, and a back surface of a different conformation with the back and the front surfaces substantially parallel.

28. In a rotary magnetic chuck a supporting housing, a plurality of pole pieces mounted within said supporting housing, said pole pieces being substantially sectorial in cross-section, sectorial coils of insulated wire adapted to be mounted on said pole pieces whereby each pole piece may be independently magnetized when said coils are energized by a suitable electric current, a face plate being provided with pole pieces cooperative with said pole pieces, and means for leading a suitable electric current to said coils.

29. In a rotary magnetic chuck in combination a supporting housing, a plurality of core pole pieces mounted within said supporting housing, a plurality of coils radially arranged on said core pole pieces with the coils connected in pairs at the outside ends thereof and the members of adjacent pairs connected together at their inside ends, whereby the electrical current flows in one direction through one coil and in the opposite direction through adjacent coils to oppositely magnetize adjacent core pole pieces, a suitable work face having work face pole pieces in engagement with the core pole pieces, and means for leading a suitable electric current to said coils.

30. In a rotary magnetic chuck a supporting housing, electro-magnetic means within said supporting housing, a face plate having pole pieces adapted to be magnetized by said electro-magnetic means, in combination with collector means, said collector means comprising a plurality of collector rings provided with notched flanges on their back edges and moldable insulating material embedding and enclosing said flanges, and means to secure said material to said supporting housing.

31. In a rotary magnetic chuck a suitable housing, a work face provided with pole pieces, electro-magnetic means for energizing said pole pieces, in combination with a collector unit, said collector unit comprising a ring of heat-hardened moldable insulating material and a pair of collector rings embedded within and secured by said material.

32. In a rotary magnetic chuck a housing, a face plate supported by said housing and comprising pole piece members, electro-magnetic means for energizing said pole piece members, in combination with a collector unit, said collector unit comprising a flat ring of heat-hardened moldable insulating material, collector rings concentrically arranged and embedded in one side of said flat ring, and means connecting said collector rings with said electro-magnetic means.

33. In a rotary magnetic chuck a housing, a plurality of individual core pole pieces mounted within said housing, a face plate in operative connection with said core pole pieces, an electric coil around each core pole piece, a connector plate in the back of said housing, terminal members on said connector plate, and means for leading a suitable electrical current to said coils to form a complete electric circuit, terminal members on said connector plate adapted to be connected to change the resistance of the electric circuit within the said chuck.

34. In a rotary magnetic chuck a housing, electro-magnetic means comprising a plurality of coils within said housing, face plate pole pieces adapted to be magnetized when said electro-magnetic means are energized, in combination with a connector plate mounted in the back of said housing, said connector plate comprising terminal members, and means adapted to connect said terminal members in such manner that said coils may be arranged in parallel or in series at the will of the operator.

35. A rotary magnetic chuck comprising supporting means and an electro-magnetic ring carried by said supporting means, said electro-magnetic ring providing a plurality of individual magnetic circuits arranged adjacent one to another with a common path for each adjacent circuit and with a portion of each magnetic circuit extending over the face plate of the chuck.

36. In a rotary magnetic chuck a non-magnetized supporting member adapted to be secured to a suitable machine tool, in combination with electro-magnetic means symmetrically arranged around the axis of rotation of said chuck, said electro-magnetic means providing a plurality of individual magnetic circuits arranged adjacent one to another, a common base core forming a part of each magnetic circuit, and adjacent magnetic circuits each having a common pole path with a portion of each magnetic circuit extending over the face plate of the chuck.

37. A rotary magnetic chuck comprising an electro-magnetic ring symmetrically arranged around the axis of rotation of the chuck, said electro-magnetic ring comprising a plurality of individual magnetic circuits, a face plate having pole pieces providing a portion of said magnetic circuits, the edges of said pole pieces being arranged in such manner that a portion of the edge of each pole piece is such as to be substantially parallel to a radial line of the chuck and another portion of the edge being substantially at right angles to such radial line, whereby a work piece on said face plate will cross the said edge when the said work piece is moved either radially or circumferentially on said face plate.

FRANK L. SIMMONS.